United States Patent [19]

Kurita

[11] Patent Number: 4,586,054

[45] Date of Patent: Apr. 29, 1986

[54] RECORDING HEAD

[75] Inventor: Kenji Kurita, Kawasaki, Japan

[73] Assignee: Canon Kabushiki Kaisha, Tokyo, Japan

[21] Appl. No.: 489,945

[22] Filed: Apr. 29, 1983

[30] Foreign Application Priority Data

May 17, 1982 [JP] Japan ............................ 57-71737[U]

[51] Int. Cl.[4] ............................................ G01D 15/16

[52] U.S. Cl. ............................... 346/76 PH; 219/543; 400/120

[58] Field of Search ....................... 346/139 C, 76 PH; 219/216 PH, 543; 400/120, 124, 125

[56] References Cited

U.S. PATENT DOCUMENTS

| | | | |
|---|---|---|---|
| 4,251,822 | 2/1981 | Hara et al. | 346/76 PH |
| 4,491,853 | 1/1985 | Hayashi et al. | 346/76 PH |

*Primary Examiner*—E. A. Goldberg
*Assistant Examiner*—A. Evans
*Attorney, Agent, or Firm*—Fitzpatrick, Cella, Harper & Scinto

[57] ABSTRACT

A recording head for a recording apparatus, which includes a plurality of recording elements, wherein the length or area of at least one dot in the recording elements at a particular position is varied with respect to the length or area of the dots of the remaining recording elements. Preferably, the length or area of the dot of at least one recording element positioned at the outermost end in the linear row of the plurality of recording elements is greater than the length or area of the dots of the remaining recording elements. By such variation in the length or the area of the dots, so-called "whitening" in the recorded image is prevented.

5 Claims, 4 Drawing Figures

RECORDING HEAD

BACKGROUND OF THE INVENTION

1. Field of the Invention

This invention relates to a recording head constructed with recording elements which form a plurality of dots.

2. Description of the Prior Art

As the recording means (or recording head) to be used for a facsimile device or the like, a thermal head has so far been widely adopted.

FIG. 1 of the accompanying drawing illustrates, in frontal view, a construction of a conventional recording head, in which a thermal head TH made up of a plurality of dots, i.e., heat generating elements HE which are linearly arranged in a single vertical row (in the up-and-down direction), is moved horizontally (in the left-and-right direction) to carry out the principal scanning. Further, the recording head is of such a construction that the portion of the heat generating elements HE functions to record image information on a heat-sensitive recording sheet (not shown in the drawing).

Upon completion of the horizontal scanning, the recording head returns to its original starting position, when the recording sheet is moved in the vertical direction (auxiliary scanning) so as to cause a new recording surface of the heat-sensitive recording sheet to confront to the thermal head, after which the principal scanning of the thermal head TH is resumed to perform the recording operation.

With the conventional recording head, however, there inevitably takes place a disadvantage such that a small gap (or a thin stripe) 5 would be formed between adjacent scan lines, i.e., at a portion between the upper and lower recorded portions 3 and 4 effected by the scanning operation, as shown in FIG. 2, unless a quantity or width of the recording sheet 1 fed in the direction of the arrow 2 is constant. The cause for such formation between the adjacent scan lines is irregularity in pitch or eccentricity at a drive power transmission member such as, for example, gears (not shown) for moving the recording sheet 1, or eccentricity at the roller portion, or deflection of the belt, or others. However, complete removal of these various causes is difficult. In order to eliminate this gap 5, it has so far been a practice to cause the upper and lower recorded portions formed by the scanning to slightly overlap each other. Even with such measures being taken, there still occurs from time to time such a thin, white stripe 5. In general, since such a whitened portion in the image is more conspicuous than the overlapped scan lines in the image, it was felt necessary to take steps against such whitening.

SUMMARY OF THE INVENTION

It is therefore a primary object of the present invention to provide an improved recording head constructed with recording elements to form a plurality of dots, with which it becomes possible to prevent the image quality from deterioration due to occurrence of whitened portions therein when the principal and auxiliary scanning operations are carried out a plurality of times.

It is the secondary object of the present invention to provide the recording head, by use of which precision in size of the parts to constitute the recording apparatus as well as precision in assembly of such component parts to construct the apparatus are relaxed to enable the recording apparatus to be easily designed and manufactured, and to further reduce the manufacturing cost.

DETAILED DESCRIPTION OF PREFERRED EMBODIMENTS

Figure 1:
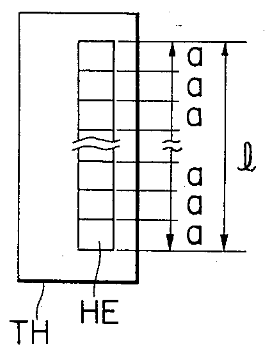
FIG. 1 is a front view showing the constructions of the heat generating elements of a conventional recording head.
Figure 2:
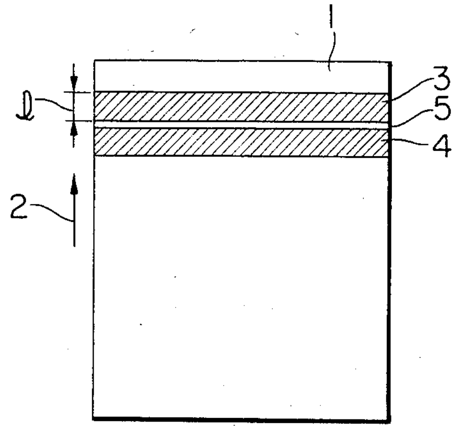
FIG. 2 is an explanatory diagram showing a state of recording by the conventional recording head.
Figure 3A:
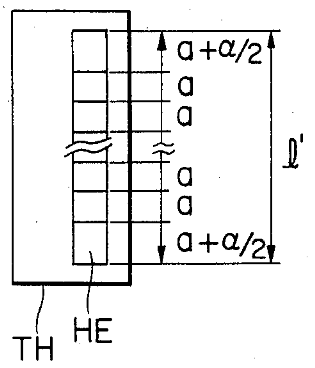
FIGS. 3A and 3B are respectively front views showing different embodiments of the recording head according to the present invention.
Figure 3B:
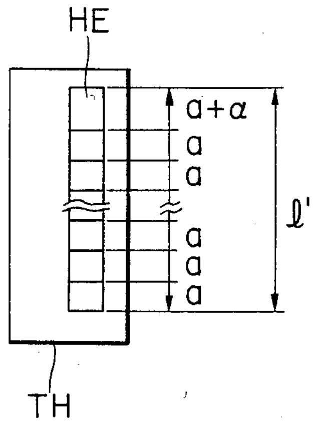

According to the recording head of the conventional type as shown in FIG. 1, the recording breadth l for one scan is represented by l=na (where n denotes the numbers of the heat generating element and a indicates the size of the dot in the plurality of heat generating elements HE). In contrast to this, the embodiments of the present invention have their recording breadth l' lengthened by $\alpha$ (i.e., $l'=na+\alpha$), as shown in FIGS. 3A and 3B. The amount represented by $\alpha$ corresponds to the irregularity in the sheet forwarding, which should preferably be made equal to, or greater than, the maximum value of the sheet forwarding irregularity.

The embodiment of FIG. 3A shows a case, in which the corrective or adjusting breadth $\alpha$ is divided into $\alpha/2$ each, and the fractions are added to the heat generating elements HE positioned at both extreme end in the row. The embodiment of FIG. 3B shows a case wherein the corrective width $\alpha$ is added to either one of the heat generating elements HE positioned at the extreme ends of the row (in this embodiment, the uppermost heat generating element).

In general, since the heat generating elements positioned outermost ends in the single row of the elements has a large heat dispersion, they are apt to be cooled readily. Therefore, with a view to preventing these outermost heat generating elements from quenching, their length or area is expanded to increase the heat capacity, which effectively provides substantially the same temperature level in each and every heat generating element. The effect is particularly remarkable in the embodiment of FIG. 3A.

As described in the foregoing, the present invention is capable of preventing the so-called "whitening" in the image due to irregularity in forwarding of the heat sensitive recording sheet only by partially varying the length or area of the heat generating elements for the recording head. On account of this, designing and manufacturing the power transmission member to drive the heat sensitive recording sheet are facilitated.

What I claim is:

1. A recording head for recording information in a line of predetermined width in one scan of the recording head, comprising:

a plurality of first recording elements arranged in a substantially linear row; and two second recording elements, each disposed at an end of said row, for recording in the same line as said first recording elements, wherein the dimension of said second recording elements measured along said row differs from the dimension of each said first recording element measured along said row.

2. A recording head according to claim 1, wherein said dimension of said second recording element is greater than said dimension of each said first recording element.

3. A method of recording image data on a recording medium, the method comprising the steps of:

moving a recording head and the recording medium relative to each other in a main scanning direction to record a line of the image data, wherein the image data includes a plurality of image elements spanning the line and each of the image elements proximate to a different edge of the line is expanded transverse to the line;

transporting the recording head and recording medium relative to each other in a sub-scanning direction by an amount substantially equal to the width of a line of image data that would result if the image elements proximate to the edges of the line were not expanded; and repeating said moving and transporting steps a desired number of times.

4. A method according to claim 3, wherein the recording head includes a row of recording elements and at least one of said recording elements at an end of said row is larger than each of the other said recording elements.

5. A method according to claim 4, wherein said recording elements at both ends of said row are longer in length, as measured along the row, than each of the remaining said recording elements.

* * * * *